United States Patent [19]

Lloyd

[11] 4,005,579

[45] Feb. 1, 1977

[54] TURBOCHARGER CONTROL AND METHOD

[75] Inventor: Richard J. Lloyd, Huntington Beach, Calif.

[73] Assignee: The Garrett Corporation, Los Angeles, Calif.

[22] Filed: Mar. 31, 1975

[21] Appl. No.: 563,864

[52] U.S. Cl. .......................... 60/602; 125/119 CD; 60/605

[51] Int. Cl.² ........................................ F02D 23/00

[58] Field of Search ............ 60/602, 605, 615, 598; 123/119 CD, 119 CE

[56] References Cited

UNITED STATES PATENTS

| | | | |
|---|---|---|---|
| 2,024,202 | 12/1935 | Berger | 60/602 X |
| 3,035,408 | 5/1962 | Silver | 60/602 |
| 3,104,520 | 9/1963 | Cazier et al. | 60/602 |
| 3,195,805 | 7/1965 | Cholvin et al. | 60/602 X |
| 3,270,495 | 9/1966 | Connor | 60/602 |
| 3,389,553 | 6/1968 | Hardy et al. | 60/602 X |
| 3,559,397 | 2/1971 | Navarro | 60/602 |

Primary Examiner—Ronald H. Lazarus
Attorney, Agent, or Firm—James W. McFarland; Albert J. Miller

[57] ABSTRACT

Method and apparatus for controlling operation of a turbocharger in an internal combustion engine as a function of intake manifold pressure at full throttle conditions, while controlling the turbocharger as a function of exhaust manifold pressure at part throttle conditions.

18 Claims, 3 Drawing Figures

TURBOCHARGER CONTROL AND METHOD

This invention relates to improved controls for turbochargers utilized in internal combustion engines.

Turbochargers for vehicle internal combustion engines normally include a compressor impeller that compresses the gas flow delivered to the intake manifold of the engine. In carbureted gasoline engines the gas flow is an air fuel mixture, while in diesel and stratified charge engines the gas flow is only air or other oxidant gas. The compressor is driven by a turbine which, in turn, is driven by exhaust flow from the engine exhaust manifold.

In such vehicle engines maximum torque is required for acceleration at lower engine speeds. Accordingly, the turbine is sized to produce high compressor speeds at these low engine speeds. At higher engine speeds where exhaust gas flow is greater, the turbine and compressor can be over-driven, particularly in cruising or part throttle conditions. This over drive reduces engine efficiency by supplying excess airflow in the case of a diesel engine, and by opposing the actions of the throttle in a gasoline engine which is attempting to restrict gas flow to the engine. In both cases excessive exhaust manifold pressure is also created.

Conventionally, a waste gate valve may be included to divert exhaust flow from passing through the turbine to reduce compressor speed. Operation of the valve is regulated to maintain relatively high intake manifold pressure for full throttle conditions to develope maximum torque. While effective to prevent over pressurization in the intake manifold, such control will not avoid excessive manifold pressure at part throttle.

It is a primary object of the present invention to provide apparatus and method for controlling turbocharger operation as a function of intake manifold pressure at full throttle conditions when high torque is required, and as a function of exhaust manifold pressure at part throttle conditions to prevent excess exhaust pressure.

A further object is to provide such a control wherein intake manifold pressure acts against a preselected gradient force to regulate movement of a waste gate valve at full throttle, while at part throttle conditions exhaust manifold pressure operates the valve.

Another object of the invention is to provide a turbocharger control having a member movable to regulate turbocharger speed that is openable by exhaust manifold pressure, an element responsive to intake manifold pressure to move into engagement with the member to open it, and means responsive to throttle position for effectively locking the member and element together at full throttle such that intake manifold pressure may open the member, and for allowing disengagement of the member and element at part throttle to allow exhaust manifold pressure to open the member to a position determined by the throttle position.

More particularly, it is an object to provide such a locking means that produces a hydraulic force in relation to throttle position which tends to move the member to a closed position.

Another particular object is to provide a mechanical locking means that urges the member toward its closed position in relation to throttle position.

These and other objects and advantages of the invention are specifically set forth in or will become apparent from the following detailed description of preferred arrangements of the invention when read in conjunction with the accompanying drawing, wherein.

Figure 1:
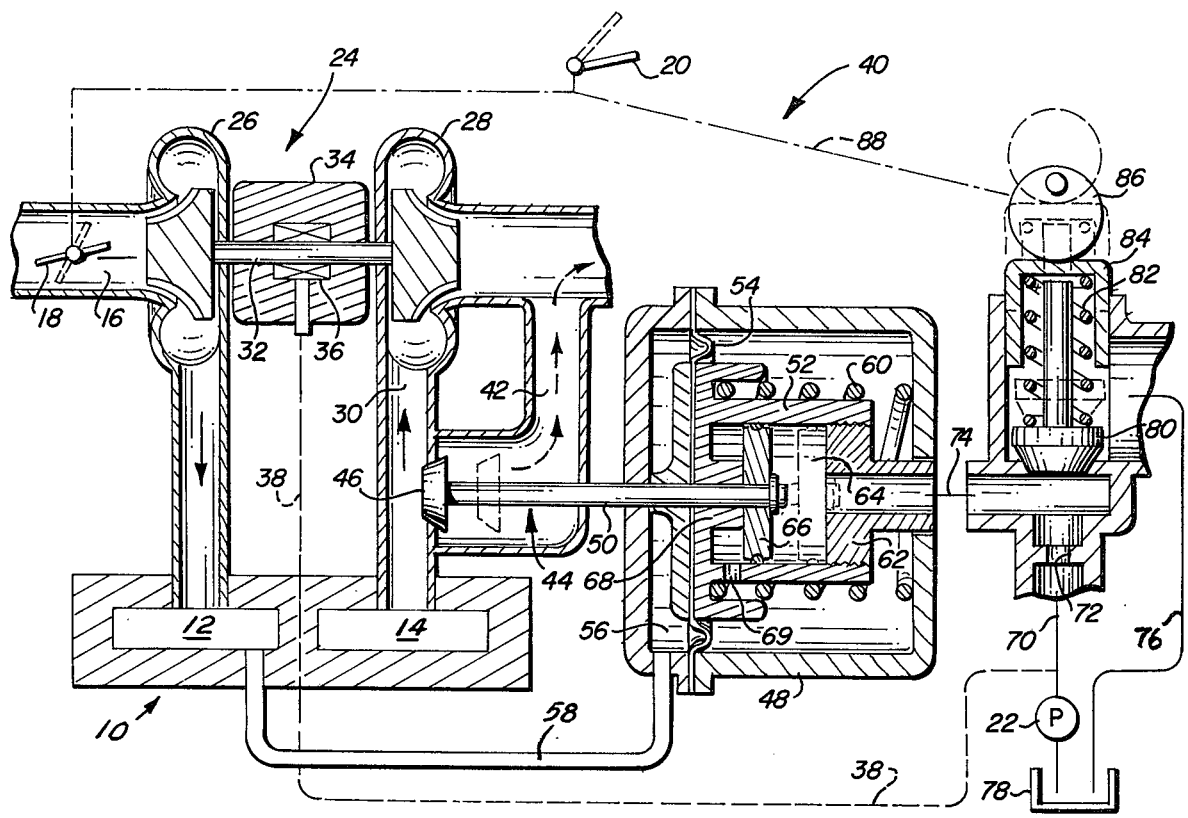
FIG. 1 is a partially diagrammatic, cross-sectional representation of the invention as incorporated into a carbureted gasoline engine.

Referring now more particularly to FIG. 1, there is illustrated an internal combustion engine 10 having an intake manifold 12, exhaust manifold 14, a passage 16 delivering an air-fuel mixture past a butterfly throttle 18 to the intake manifold, an accelerator pedal 20 connected to throttle 18, and an oil lubrication pump 22. The engine also includes a carburetor (not shown) upstream of throttle 18 for mixing air and fuel prior to delivery to the intake manifold. The invention is equally useful, however, in diesel, stratified charge or other type engines.

In conjunction with engine 10 is a turbocharger, generally designated by the numeral 24, which includes a compressor impeller 26 in passage 16 for pressurizing gas flow to the intake manifold, and a turbine 28 disposed in an exhaust passage 30 to be driven by exhaust gas flow from the exhaust manifold. Turbine 28 drives compressor 26 directly through a shaft 32 carried within a housing 34 on bearing 36. Lubricating oil flow from pump 22 is fed through duct 38 to bearing 36. The pump, of course, also provides lubrication for the remainder of the engine.

Apparatus generally designated by the numeral 40 is provided to control exhaust manifold pressure and turbocharger operation. The apparatus includes a bypass duct 42 communicating with exhaust passage 30 in parallel flow relationship to turbine 28, and a valve member 44 movable to regulate exhaust flow from passage 30 through duct 42 in bypassing relationship to the turbine. A face 46 of member 44 is exposed to pressure of exhaust gas flow to produce a pneumatic opening force on valve 44 urging it rightwardly toward an open position illustrated by dashed lines. A housing 48 which may be integral with housing 34, receives a stem portion 50 of valve 44 within the hollowed interior of the housing.

An element 52 movably mounted within housing 48, slidably receives stem 50. Element 52 includes a movable diaphragm wall 54 traversing the housing and cooperating therewith to define a pneumatic chamber 56 communicating with intake manifold 12 via conduit means 58. Biasing means in the form of a gradient force compression spring 60 extends between the housing and element 52 to urge the latter leftwardly against the force created by intake manifold pressure in chamber 56. The element 52 is provided with a closure 62 for defining a second, hydraulic chamber 64 within element 52. Member 44 includes a wall 66 traversing the second chamber 64 in sealing relationship therewith. Wall 66 is rigidly affixed to move with stem 50 and defines a stop on member 44 engagable with a stop 68 on element 52 as illustrated in FIG. 1. A bore 69 in element 52 communicates the zone behind wall 66 with ambient pressure through the remainder of the interior of housing 48 to prevent build up of back pressure on wall 66.

A hydraulic fluid inlet conduit 70 communicates across a fixed orifice 72 with chamber 64 through a flexible conduit 74 to create a hydraulic closing force on wall 66. A fluid exhaust conduit 76 leading to low pressure return reservoir 78 communicates with inlet conduit 70 across a variable restrictor means illustrated in the form of a restrictor valve 80 biased toward its closed position shown by a spring 82. Spring 82 abuts against a movable follower 84 vertically shiftable in response to rotation of a cam 86 operably connected with throttle 18 and accelerator pedal 20 through appropriate linkage 88.

In operation, exhaust gas flow in passage 30 spins turbine 28 to drive compressor 26 and pressurize intake manifold and produce greater gas flow into the engine cylinders as compared to the gas flow in naturally aspirated engines. For acceleration from lower speeds, pedal 20 is depressed to move throttle 18 to a substantially full open position illustrated. Such pedal movement also rotates cam 86 and thereby increases the spring closing force exerted on restrictor 80. Accordingly, higher hydraulic pressure builds up in chamber 64 in relation to throttle position before restrictor 80 opens and permits recirculation of the hydraulic fluid to exhaust conduit 76 and reservoir 78. Orifice 72 assures that there will be sufficient lubricating oil flow to the remainder of the engine.

The higher pressure in chamber 64 exerts a sufficiently great force on wall 66 to overcome the force exerted by exhaust pressure on face 46, and valve 44 shifts leftwardly to its closed position shown, closing off bypass flow through duct 42. Thus, all exhaust gas flow crosses turbine 28 to increase compressor speed and intake manifold pressure so that maximum engine torque may be developed. In such full throttle conditions, wall 66 and stop 68 are in interengagement. As intake manifold pressure increases, the opening force exerted on element 52 by pressure in chamber 56 acts against the gradient biasing force of spring 60 which is preselected in relation to the maximum intake manifold pressure desired to be developed. Thus, to prevent overpressurization, the force exerted by intake manifold pressure can overcome the biasing force and shift element 52 rightwardly, carrying the interengaged valve 44 with it toward an open position depicted in dashed lines. A portion of the exhaust flow then bypasses turbine 28 through duct 42 to reduce compressor speed and intake manifold pressure.

It is important to note that in the full throttle conditions described, the force exerted by pressure in chamber 56 is opposed substantially only by the biasing force of spring 60. The interengagement of wall 66 with stop 68 assures that the hydraulic force of pressure in chamber 64 does not oppose the intake manifold pressure in chamber 56. Thus, at full throttle compressor speed in controlled in relation to intake manifold pressure.

Once cruising conditions are reached as the vehicle attains the desired speed, the accelerator pedal retreats to a part throttle position restricting gas flow in passage 16. Through linkage 88 cam 86 rotates to permit upward movement of follower 84 and reduce the tension of spring 82. The reduced force on restrictor 80 thereby reduces the hydraulic pressure developed in chamber 64. (It will be noted that this control arrangement is substantially insensitive to variations in pressure developed by the source pump 22.) The force exerted by exhaust gas pressure on face 46 is not capable of moving valve 44 rightwardly toward its open position to reduce flow through turbine 28 and speed of compressor 26. In this part throttle condition the intake manifold pressure is normally of insufficient magnitude to open valve 44; however the free opening movement allowed valve 44 relative to element 52 permits control of compressor speed in relation to exhaust gas pressure. Thus, a part throttle exhaust gas pressure is maintained at a relatively low level and overdrive of the turbocharger is eliminated.

In part throttle conditions, the force exerted on valve 44 by exhaust gas pressure is opposed substantially only by the hydraulic pressure in chamber 64. Spring 60 acts only against element 52 and does not oppose the opening force created by exhaust gas pressure. Thus, at part throttle compressor speed is controlled in relation to exhaust manifold pressure. It will be apparent that the hydraulic pressure in chamber 64 takes on a value dependent upon the degree of depression of pedal 20 so that the exhaust gas pressure permitted to be developed at part throttle increases with greater pedal depression and throttle opening.

Accordingly, the invention provides a means for sensing throttle position and exerting a related closing force on valve 44 opposing the exhaust gas pressure, as well as means for sensing intake manifold pressure and exerting a related opening force on valve 44 opposing the biasing force of spring 60. Yet, the throttle-determined closing force does not oppose the intake manifold pressure opening force, and the spring biasing force does not oppose the exhaust gas pressure force.

Figures 2, 3:
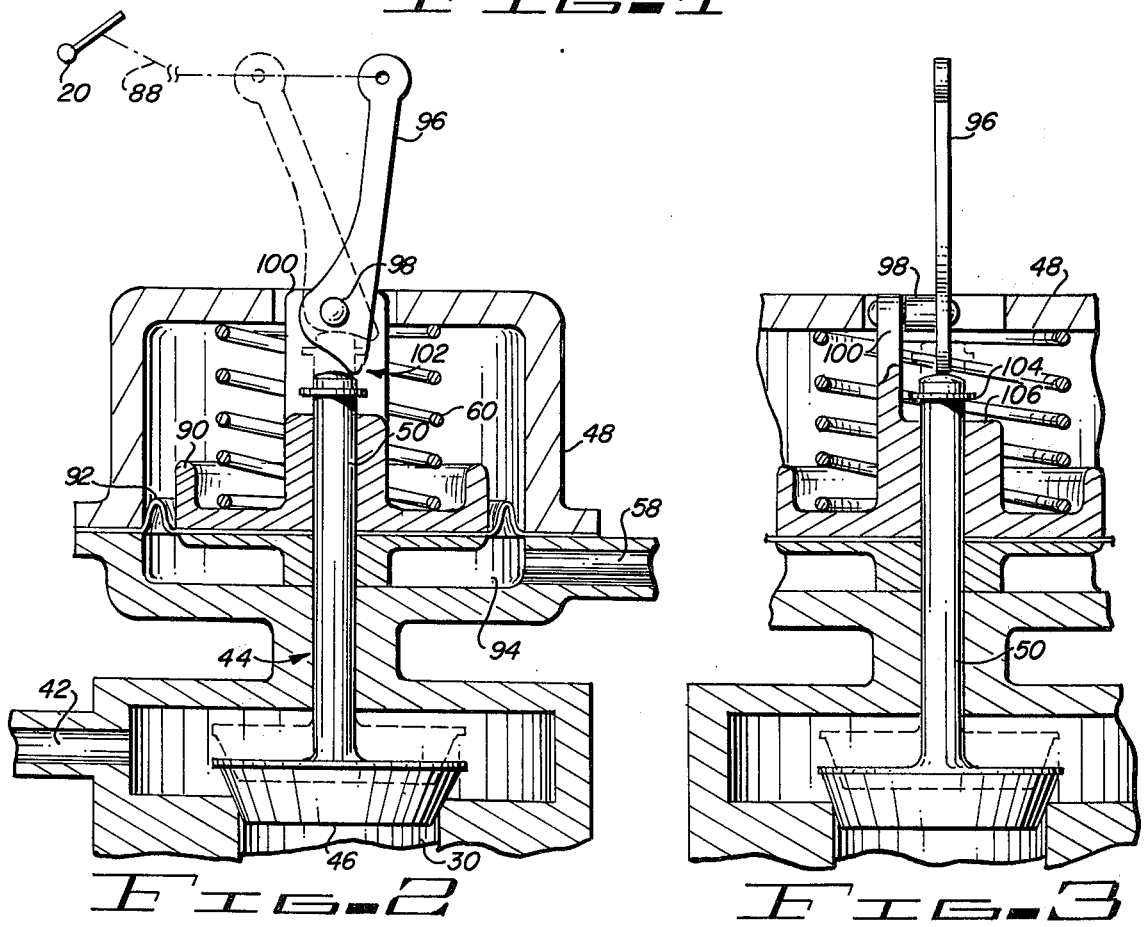
FIG. 2 is a cross-sectional, front elevational view of a modified waste gate valve control.
FIG. 3 is a side elevational view in cross-section of the apparatus shown in FIG. 2.

FIGS. 2 and 3 illustrate an alternate embodiment of the means for producing a closing force on valve 44 in relation to throttle position. Valve stem 50 is slidably received in a slightly modified element 90 which has a diaphragm 92 defining a chamber 94 communicating with the intake manifold via the conduit 58, but which does not have a second hydraulic chamber therewithin. A lever 96 is pivotally mounted on a pin 98 affixed to an offset extension portion 100 of element 90. A curved lower surface 102 of lever 96 is engagable with stem 50 which carries a snap ring stop 104 engagable with stop shoulder 106 of element 90.

Depression of pedal 20 causes linkage 88 to rotate lever 96 to the position shown wherein surface 102 mechanically forces valve 44 to its closed position to allow development of high engine torque as in the preceding embodiment. To prevent overpressurization of the intake manifold, the pressure in chamber 94 again acts substantially only against the biasing force of spring 60 since lever 96 is pivotally mounted upon element 90 and will move upwardly therewith whenever pressure in chamber 94 moves element 90 upwardly and causes interengagement of stops 104 and 106 to thereupon open valve 44.

At part throttle positions of pedal 20, lever 96 pivots to the position shown in dashed lines. The shape of lower surface 102 thereupon allows opening movement of valve 44 in response to the force of exhaust gas pressure in passage 30 upon valve face 46. Again, the force of spring 60 does not oppose the exhaust gas pressure, and operation of the control proceeds as in the FIG. 1 arrangement.

It will thus be apparent that the invention provides a method of turbocharger control wherein compressor speed is respectively controlled in relation to intake and exhaust manifold pressures at full throttle and part throttle conditions. Movement of waste gate valve 44 is controlled to vary turbocharger speed by allowing exhaust gas pressure to produce an opening force on the valve, by producing a closing force on the valve in relation to throttle position, and by producing an opening force in relation to intake manifold pressure. A biasing force opposes the force of intake manifold pressure without acting upon the valve so that the intake manifold pressure needs to overcome substantially only the biasing force to open the valve, while exhaust gas pressure needs to overcome substantially only the throttle-determined force to open the valve. The forces discussed above are the qualitatively primary forces operating upon the waste gate valve, but it is to be recognized that secondary forces such as friction will be present. Also, the various primary forces may, depending upon design specifics, produce transient or dynamic effects on the valve in unusual or specific conditions of system operation.

Various modifications and alterations to the invention will be apparent to those skilled in the art. In diesel engines, for instance, the accelerator pedal and linkage 88 will be operably connected with the fuel rack instead of the gas flow throttle 18 of carbureted engines. Accordingly, the foregoing specific description of a preferred embodiment of the invention is to be considered exemplary in the nature and not as limiting to the scope and spirit of the invention as set forth in the appended claims.

Having described the invention with sufficient clarity that those skilled in the art may make and use it, I claim:

1. In combination with a turbocharger, an internal combustion engine having an intake manifold, an exhaust manifold, and a throttle positionable to vary power developed by the engine, said turbocharger comprising:
   a turbine operably associated with said exhaust manifold to be driven by exhaust gas flow from the engine;
   a compressor driven by said turbine and operably associated with said intake manifold to deliver gas flow thereto at a pressure which varies with the speed of said compressor;
   a member exposed to said exhaust gas flow and movable toward an open position diverting exhaust gas flow from said turbine to reduce turbine speed and pressure developed in said exhaust manifold, said exhaust manifold pressure exerting a first force on said member urging the latter toward an open position;
   means operably associated with said throttle and said member for exerting a second force on said member in relation to said throttle position, said second force opposing said first force to urge said member toward a closed position to increase turbine speed;
   an element engageable with said member;
   means operably associated with said intake manifold and said element for exerting a third force on said element in relation to the pressure in said intake manifold, said third force urging said element into engagement with said member to move the latter toward said open position; and
   biasing means engaging said element to exert a biasing force on said element opposing said third force without acting upon said member, whereby said first force must overcome only said second force to move said member to said open position.

2. A combination as set forth in claim 1, wherein said second force means is arranged relative to said element such that said second force does not act upon said element whereby said third force must overcome only said biasing force to urge said member toward said open position.

3. A combination as set forth in claim 2, further including a housing receiving said element and defining a chamber, and conduit means communicating said chamber with said intake manifold whereby intake manifold pressure in said chamber produces said third force.

4. A combination as set forth in claim 3, wherein said biasing means comprises a compressible, gradient force spring disposed in said housing and engaging said element, said third force urging said element to move to compress said spring.

5. A combination as set forth in claim 3, wherein said member extends into said housing and is movably received in said element.

6. A combination as set forth in claim 5, wherein said element includes a movable diaphragm wall extending across said chamber, said member including a stem section extending through said wall in movable, sealing relationship thereto.

7. A combination as set forth in claim 6, further including a bypass duct for carrying exhaust flow from said exhaust manifold in bypass relationship to said turbine, said member including a valve affixed to said stem and disposed in said bypass duct for controlling bypass flow therethrough.

8. A combination as set forth in claim 6, wherein said stem and said element have stops thereon interengagable as said element moves in response to said third force, said stops being disengagable as said element moves in response to said biasing force to thereby allow said member to move freely relative to said element under the urgings of said first and second forces.

9. A combination as set forth in claim 8, wherein said element defines a second chamber within said element, said stop on said member being a wall traversing said second chamber, said second force means being operable to develop a hydraulic pressure in said second chamber in relation to said throttle position.

10. A combination as set forth in claim 9, wherein said second force means includes an inlet conduit adapted to communicate said second chamber with a source of fluid under pressure, an exhaust conduit adapted to communicate said inlet conduit with a low pressure fluid reservoir, and variable restrictor means operably connected with said throttle for variably controlling fluid flow from said inlet conduit to said exhaust conduit to vary pressure developed in said second chamber.

11. A combination as set forth in claim 10, wherein said variable restrictor means includes a restrictor disposed in said exhaust conduit, a spring exerting a spring force urging said restrictor in a direction causing increase in said pressure developed in said second chamber, and linkage operably extending between said throttle and said biasing means for varying said spring force in accordance with throttle position.

12. A combination as set forth in claim 8, wherein said second force means includes a lever pivotally mounted to said element and operably connected with said throttle for pivoting relative to said element in response to throttle movement, said lever having a surface engagable with said stem for holding said member in said closed position in opposition to said first force upon movement of said throttle in positions requiring higher power from said engine, said lever movable with said element to allow said third force to urge said member toward its open position.

13. A combination as set forth in claim 12, wherein said lever surface is shaped whereby upon movement of said throttle to partial throttle positions requiring lesser power from said engine and consequent pivoting of said lever, said member may shift toward its open position in response to said first force.

14. In combination with an internal combustion engine having and intake manifold and a throttle positionable to vary power developed by the engine, a turbocharger driven by flow of exhaust gases from the engine and operable to deliver gas flow to said intake manifold, and apparatus, for controlling operation of said turbocharger comprising:

a member exposed to said exhaust gas flow and movable to regulate exhaust gas flow through said turbocharger to control speed of the latter, the pressure of said exhaust gas flow exerting a first force on said member urging the latter in a direction decreasing said turbocharger speed;

first sensing means for sensing throttle position;

means responsive to said first sensing means and operably associated with said member for exerting a second force thereon opposing said first force of exhaust gas pressure and urging said member in a direction increasing turbocharger speed;

an element engageable with said member;

second sensing means for sensing intake manifold pressure; and means responsive to said second sensing means and operably associated with said element for exerting a third force thereon in relation to intake manifold pressure urging said element to engage said member to move the latter in said direction decreasing turbocharger speed.

15. A combination as set forth in claim 14, further including biasing means exerting a biasing force on said element opposing said third force without acting upon said member, whereby said first force must overcome only said second force to move said member in said direction decreasing turbocharger speed.

16. In combination with an internal combustion engine having an intake manifold, and exhaust manifold, a turbocharger delivering gas flow to said intake manifold, and a throttle positionable to vary power developed by the engine, said turbocharger being driven by exhaust gas flow from the engine, apparatus for controlling exhaust manifold pressure comprising:

a member exposed to said exhaust gas flow whereby the pressure of said exhaust gas exerts a first force on said member urging the latter toward an open position diverting exhaust gas flow from said turbocharger to thereby reduce its speed and reduce exhaust manifold pressure;

means operably associated with said intake manifold and said member for exerting a second force on said member in relation to intake manifold pressure urging said member toward said open position;

biasing means operably associated with said second force means for exerting a biasing force opposing said second force without acting upon said member; and means operably associated with said throttle and said member for exerting a third force on said member in relation to throttle position, said third force urging said member toward a closed position to increase turbocharger speed and intake manifold pressure, whereby at throttle positions requiring higher power from the engine said third force opposes said first and second forces in moving said member, while at partial throttle positions requiring lesser engine power said first force overcomes said third force to move said member to reduce exhaust manifold pressure.

17. A method of controlling a waste gate valve operable to vary speed of a turbocharger delivering gas flow to the intake manifold of an internal combustion engine having a throttle positionable to vary power developed by the engine, said turbocharger being driven by exhaust gas flow from the engine and said valve operable to vary said flow to said turbocharger; comprising the steps of:

urging said valve toward an open position reducing turbocharger speed by a first force developed by pressure of sid exhaust gas flow;

producing a second force on said valve in relation to the position of said throttle, said second force urging said valve toward a closed position increasing turbocharger speed;

producing a third force on said valve in relation to intake manifold pressure, said third force urging said valve toward said open position; and producing a biasing force opposing said third force without acting upon said valve, whereby said third force overcomes substantially only said biasing force to move said valve to its open position while said first force overcomes substantially only said second force to move said valve to its open position.

18. A method of controlling speed of operation of a turbocharger delivering gas flow to the intake manifold of an internal combustion engine having a throttle positionable to vary torque developed by the engine, said turbocharger being driven by exhaust gas flow from the engine; comprising the steps of:

sensing throttle position, intake manifold pressure, and exhaust manifold pressure;

controlling turbocharger speed in relation to said sensed intake manifold pressure whenever said throttle is at substantially full throttle position requiring substantially maximum torque from said engine; and controlling turbocharger speed in relation to said sensed exhaust manifold pressure whenever said throttle is at part throttle position.

* * * * *

UNITED STATES PATENT AND TRADEMARK OFFICE
CERTIFICATE OF CORRECTION

PATENT NO. : 4,005,579
DATED : February 1, 1977
INVENTOR(S) : RICHARD J. LLOYD

It is certified that error appears in the above-identified patent and that said Letters Patent are hereby corrected as shown below:

Column 1, line 31, read "develope" as --develop--.

Column 7, line 15, delete the second comma [,].

Column 8, line 29, read "sid" as --said--.

Signed and Sealed this

Thirty-first Day of May 1977

[SEAL]

Attest:

RUTH C. MASON
*Attesting Officer*

C. MARSHALL DANN
*Commissioner of Patents and Trademarks*